United States Patent
Ramsey et al.

(10) Patent No.: US 11,505,056 B2
(45) Date of Patent: Nov. 22, 2022

(54) P1 HYBRID MODULE

(71) Applicant: Schaeffler Technologies AG & Co. KG, Herzogenaurach (DE)

(72) Inventors: John Ramsey, Mansfield, OH (US); Markus Steinberger, Sagamore Hills, OH (US); Matthew Payne, Glenmont, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 205 days.

(21) Appl. No.: 16/891,354

(22) Filed: Jun. 3, 2020

(65) Prior Publication Data

US 2020/0384846 A1 Dec. 10, 2020

Related U.S. Application Data

(60) Provisional application No. 62/859,392, filed on Jun. 10, 2019.

(51) Int. Cl.

| | |
|---|---|
| *B60K 6/00* | (2006.01) |
| *B60K 6/405* | (2007.10) |
| *B60K 17/02* | (2006.01) |
| *B60K 6/26* | (2007.10) |
| *H02K 7/00* | (2006.01) |
| *B60K 6/48* | (2007.10) |
| *H02K 1/28* | (2006.01) |

(52) U.S. Cl.
CPC ............ *B60K 6/405* (2013.01); *B60K 6/26* (2013.01); *B60K 17/02* (2013.01); *H02K 7/006* (2013.01); *B60K 2006/4825* (2013.01); *B60Y 2200/92* (2013.01); *B60Y 2400/426* (2013.01); *H02K 1/28* (2013.01)

(58) Field of Classification Search
CPC .......... B60K 6/485; B60K 6/405; B60K 6/26; F16D 33/18; F16D 25/083
See application file for complete search history.

(56) References Cited

U.S. PATENT DOCUMENTS

| | | | | |
|---|---|---|---|---|
| 6,492,742 B1 * | 12/2002 | Fujikawa | ............... | B60K 6/365 |
| | | | | 903/910 |
| 8,838,366 B2 * | 9/2014 | Suyama | ................... | B60L 7/24 |
| | | | | 701/67 |
| 9,051,976 B2 * | 6/2015 | Kuwahara | ............. | F16D 25/083 |
| 9,140,311 B2 * | 9/2015 | Iwase | .................. | B60L 15/2054 |
| 9,481,234 B2 * | 11/2016 | Ideshio | .................. | B60K 6/405 |
| 9,917,482 B2 * | 3/2018 | Lindemann | .......... | H02K 11/225 |
| 2008/0072586 A1 * | 3/2008 | Hammond | ............. | B60K 6/485 |
| | | | | 60/330 |

(Continued)

*Primary Examiner* — Hau V Phan

(57) ABSTRACT

A P1 hybrid module for a vehicle includes a housing, a motor stator, an input shaft, a resolver rotor, an output flange, a motor rotor, a housing plate, and a resolver stator. The housing is arranged for fixing to an engine and a multi-speed transmission. The motor stator is fixed to the housing. The input shaft is arranged for driving connection to a flange of a damper. The resolver rotor is fixed to the input shaft. The output flange is arranged for fixing to a torque converter. The motor rotor is rotatably fixed to the output flange. The housing plate is fixed to the housing by a first fastener. The resolver stator is fixed to the housing plate radially outside of the resolver rotor.

16 Claims, 1 Drawing Sheet

(56) References Cited

U.S. PATENT DOCUMENTS

| | | | | |
|---|---|---|---|---|
| 2008/0093135 | A1* | 4/2008 | Nomura | B60L 58/40 |
| | | | | 903/906 |
| 2009/0100965 | A1* | 4/2009 | Sanji | B60K 6/387 |
| | | | | 180/65.6 |
| 2009/0105040 | A1* | 4/2009 | Sanji | B60K 6/48 |
| | | | | 290/4 C |
| 2011/0036652 | A1* | 2/2011 | Honda | B60L 50/16 |
| | | | | 903/902 |
| 2011/0240430 | A1* | 10/2011 | Iwase | B60K 6/405 |
| | | | | 903/914 |
| 2012/0032544 | A1* | 2/2012 | Kasuya | B60L 15/20 |
| | | | | 310/90 |
| 2013/0087425 | A1* | 4/2013 | Frait | F16H 61/62 |
| | | | | 60/330 |
| 2014/0124318 | A1* | 5/2014 | Frait | B60K 6/405 |
| | | | | 29/428 |
| 2015/0022064 | A1* | 1/2015 | Yamaguchi | H02K 16/00 |
| | | | | 310/68 B |

* cited by examiner

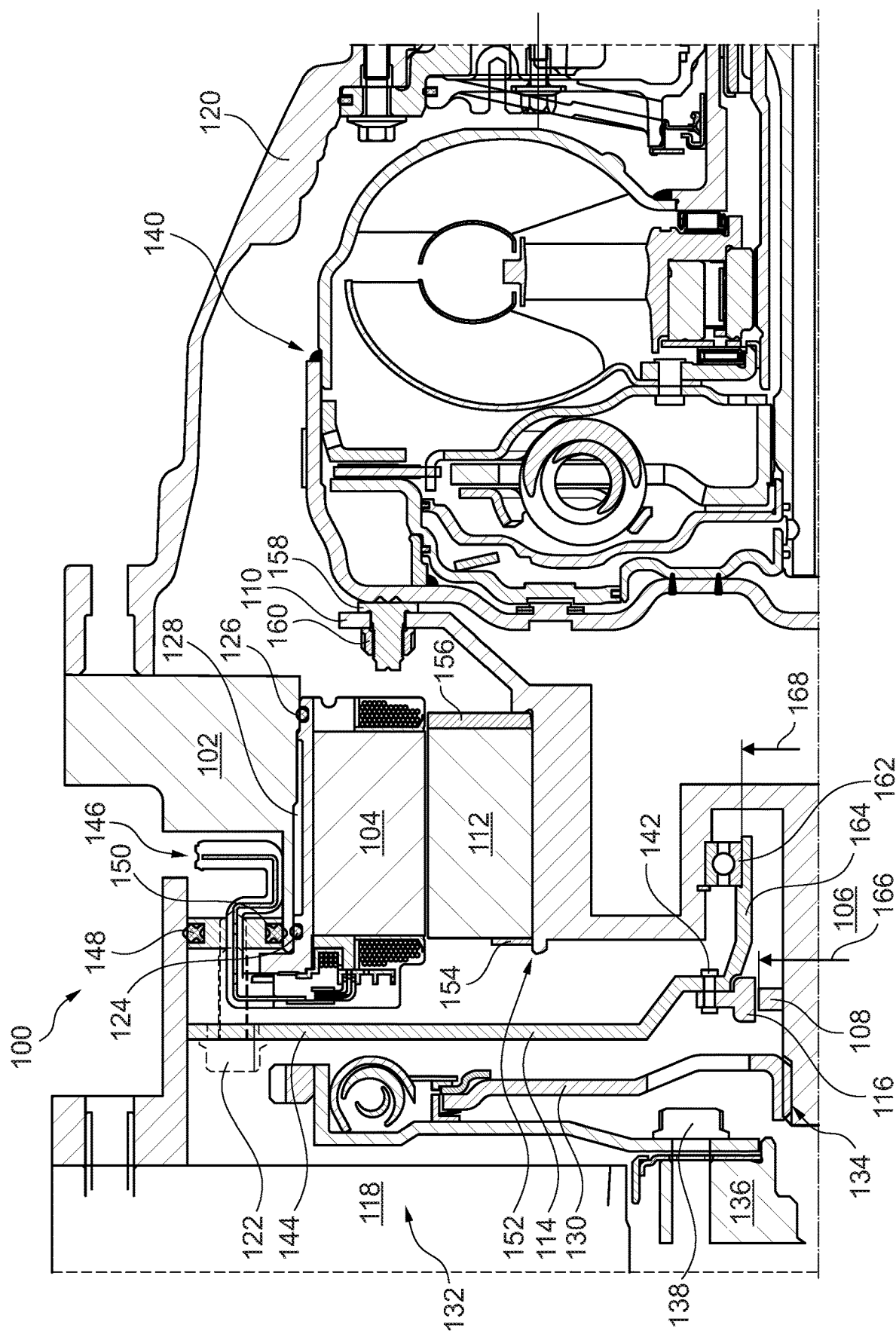

P1 HYBRID MODULE

TECHNICAL FIELD

The present disclosure relates generally to a hybrid module for a vehicle, and more specifically to a P1 hybrid module.

BACKGROUND

Hybrid modules are known. One example is shown in commonly-assigned U.S. Pat. No. 9,917,482 titled HYBRID DRIVE MODULE HAVING A ROTOR SECURED TO A HUB VIA STAKING.

SUMMARY

Example embodiments broadly comprise a P1 hybrid module for a vehicle, including a housing, a motor stator, an input shaft, a resolver rotor, an output flange, a motor rotor, a housing plate, and a resolver stator. The housing is arranged for fixing to an engine and a multi-speed transmission. The motor stator is fixed to the housing. The input shaft is arranged for driving connection to a flange of a damper. The resolver rotor is fixed to the input shaft. The output flange is arranged for fixing to a torque converter. The motor rotor is rotatably fixed to the output flange. The housing plate is fixed to the housing by a first fastener. The resolver stator is fixed to the housing plate radially outside of the resolver rotor.

In an example embodiment, the input shaft is fixed to the output flange. In an example embodiment, the resolver stator is fixed to the housing plate by a rivet. In an example embodiment, the housing plate includes an annular portion arranged axially adjacent to the motor stator. In an example embodiment, the P1 hybrid module includes a connector for electrically connecting the P1 hybrid module to the vehicle. The connector has a first annular seal and a second annular seal for sealing the connector to the housing. In an example embodiment, the motor rotor is rotatably fixed to the output flange by staking.

In some example embodiments, the P1 hybrid module includes the torque converter fixed to the output flange. In an example embodiment, the torque converter includes a plurality of studs extending through the output flange. Each stud is fixed to the output flange by a respective nut. In some example embodiments, the P1 hybrid module includes a bearing arranged radially between and in contact with the input shaft and the housing plate. In an example embodiment, the housing plate includes a tubular portion for receiving the bearing. In an example embodiment, the resolver rotor includes a resolver rotor outer diameter, and the bearing includes a bearing inner diameter, greater than the resolver rotor outer diameter.

BRIEF DESCRIPTION OF THE DRAWINGS

The single FIGURE illustrates a top half cross-sectional view of a P1 hybrid module according to an example aspect of the present disclosure.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the FIGURES can be combined with features illustrated in one or more other FIGURES to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

The single FIGURE illustrates a top half cross-sectional view of P1 hybrid module 100 according to an example aspect of the present disclosure. Module 100 includes housing 102, motor stator 104, input shaft 106, resolver rotor 108, output flange 110, motor rotor 112, housing plate 114, and resolver stator 116. The housing is arranged for fixing to an engine (shown partially at 118) and a multi-speed transmission (shown partially at 120). The motor stator is fixed to the housing by bolt 122, for example, and sealed to the housing by seals 124 and 126. Area 128 provides a "water jacket" for receiving a cooling fluid to cool the stator. Input shaft 106 is arranged for driving connection to flange 130 of damper 132. In the example shown in the FIGURE, the input shaft and the flange include complementary splines 134 for driving connection. In the example embodiment shown in the FIGURE, damper 132 is a dual mass flywheel fixed to crankshaft 136 of the engine by bolt 138.

Resolver rotor 108 is fixed to the input shaft by a press-fit connection, for example. The output flange arranged for fixing to torque converter 140 as described in more detail below. The motor rotor is rotatably fixed to the output flange as described below. The housing plate is fixed to the housing by bolt 122. The resolver stator is fixed to the housing plate radially outside of the resolver rotor. The resolver stator is fixed to the housing plate by rivet 142, for example. The input shaft is fixed to the output flange. Input shaft 106 and output flange 110 may be integrally formed from a same piece of material as shown in the FIGURE, or formed as separate components fixed together by welding, rivets, splines, press-fits, or any other fixing method known in the art.

Housing plate 114 includes annular portion 144 arranged axially adjacent to the motor stator. The hybrid module includes connector 146 for electrically connecting the P1 hybrid module to the vehicle. The connector includes annular seals 148 and 150 for sealing the connector to the housing. The connector is arranged to receive a slip-fit vehicle plug (not shown). The motor rotor is rotatably fixed to the output flange by staking at location 152, for example.

End plates 154 and 156 are arranged axially between the rotor and portions of the output flange. One of end plates 154 and 156 may be a resilient element that is compressed during staking to prevent rotation of the rotor relative to output flange. The motor rotor and output flange may also be drivingly connected by a spline or keyway, for example.

In an example embodiment, the P1 hybrid module includes the torque converter. The torque converter includes studs 158 extending through the output flange. The studs are fixed to the output flange by nuts 160. Bearing 162 is arranged radially between and in contact with the input shaft and the housing plate. Housing plate 114 includes tubular portion 164 for receiving the bearing. Although bearing 162 is shown radially outside of tubular portion 164, other embodiments are possible. For example, bearing 162 may be disposed radially inside of tubular portion 164 between the tubular portion and the input shaft. Resolver rotor 108 includes resolver rotor outer diameter 166 and bearing 162 includes bearing inner diameter 168, greater than the resolver rotor outer diameter.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 P1 hybrid module
102 Housing
104 Motor stator
106 Input shaft
108 Resolver rotor
110 Output flange
112 Motor rotor
114 Housing plate
116 Resolver stator
118 Engine (partial)
120 Transmission (partial)
122 Bolt
124 Seal
126 Seal
128 Area (water jacket)
130 Flange
132 Damper
134 Splines
136 Crankshaft
138 Bolt
140 Torque converter
142 Rivet
144 Annular portion (housing plate)
146 Connector
148 Seal (connector)
150 Seal (connector)
152 Staking location
154 End plate
156 End plate
158 Studs (torque converter)
160 Nuts
162 Bearing
164 Tubular portion (housing plate)
166 Resolver rotor outer diameter
168 Bearing inner diameter

What is claimed is:

1. A P1 hybrid module for a vehicle, comprising:
a housing arranged for fixing to an engine and a multi-speed transmission;
a motor stator fixed to the housing;
an input shaft arranged for driving connection to a flange of a damper;
a resolver rotor fixed to the input shaft;
an output flange arranged for fixing to a torque converter;
a motor rotor rotatably fixed to the output flange;
a housing plate, fixed to the housing by a first fastener;
a resolver stator fixed to the housing plate radially outside of the resolver rotor; and
a connector for electrically connecting the P1 hybrid module to the vehicle, the connector comprising a first annular seal and a second annular seal for sealing the connector to the housing.

2. The P1 hybrid module of claim 1 wherein the input shaft is fixed to the output flange.

3. The P1 hybrid module of claim 1 wherein the housing plate includes an annular portion arranged axially adjacent to the motor stator.

4. The P1 hybrid module of claim 1 wherein the motor rotor is rotatably fixed to the output flange by staking.

5. The P1 hybrid module of claim 1 further comprising the torque converter fixed to the output flange.

6. The P1 hybrid module of claim 1 further comprising a bearing arranged radially between and in contact with the input shaft and the housing plate, wherein the housing plate comprises a tubular portion for receiving the bearing.

7. The P1 hybrid module of claim 6 wherein:
the resolver rotor includes a resolver rotor outer diameter; and,
the bearing includes a bearing inner diameter, greater than the resolver rotor outer diameter.

8. The P1 hybrid module of claim 6 wherein:
the resolver rotor includes a resolver rotor outer diameter; and,
the bearing includes a bearing inner diameter, greater than the resolver rotor outer diameter.

9. A P1 hybrid module for a vehicle, comprising:
a housing arranged for fixing to an engine and a multi-speed transmission;
a motor stator fixed to the housing;
an input shaft arranged for driving connection to a flange of a damper;
a resolver rotor fixed to the input shaft;
an output flange arranged for fixing to a torque converter;
a motor rotor rotatably fixed to the output flange;
a housing plate, fixed to the housing by a first fastener; and, a resolver stator fixed to the housing plate radially outside of the resolver rotor; and a bearing arranged radially between and in contact with the input shaft and the housing plate, wherein:

the resolver rotor includes a resolver rotor outer diameter; and, the bearing includes a bearing inner diameter, greater than the resolver rotor outer diameter.

10. The P1 hybrid module of claim 9 wherein the input shaft is fixed to the output flange.

11. The P1 hybrid module of claim 9 wherein the housing plate comprises a tubular portion for receiving the bearing.

12. The P1 hybrid module of claim 9 wherein the housing plate includes an annular portion arranged axially adjacent to the motor stator.

13. The P1 hybrid module of claim 9 further comprising a connector for electrically connecting the P1 hybrid module to the vehicle and comprising a first annular seal and a second annular seal for sealing the connector to the housing.

14. The P1 hybrid module of claim 9 wherein the motor rotor is rotatably fixed to the output flange by staking.

15. The P1 hybrid module of claim 9 further comprising the torque converter fixed to the output flange.

16. The P1 hybrid module of claim 15 wherein the torque converter comprises a plurality of studs extending through the output flange, each stud being fixed to the output flange by a respective nut.

* * * * *